United States Patent [19]
Pickrell

[11] Patent Number: 5,026,104
[45] Date of Patent: Jun. 25, 1991

[54] GRIPPING APPARATUS

[75] Inventor: John W. Pickrell, Scottsdale, Ariz.

[73] Assignee: Government Innovators, Inc., Phoenix, Ariz.

[21] Appl. No.: 472,616

[22] Filed: Jan. 30, 1990

Related U.S. Application Data

[63] Continuation of Ser. No. 308,839, Feb. 9, 1989.

[51] Int. Cl.[5] .............................................. B66F 9/18
[52] U.S. Cl. ............................ 294/86.4; 294/902; 294/106; 414/406
[58] Field of Search ................... 294/86.4, 111, 106, 294/902; 901/33-35; 414/406, 407, 421, 620, 621, 910

[56] References Cited

U.S. PATENT DOCUMENTS

| | | | |
|---|---|---|---|
| 3,322,455 | 5/1967 | Gressbach | 294/902 X |
| 3,850,469 | 11/1974 | Nit | 294/111 X |
| 3,970,342 | 7/1976 | Cotton | 294/86.4 |
| 4,084,706 | 4/1978 | Russell | 294/111 X |
| 4,351,553 | 9/1982 | Rovetta et al. | 294/111 X |
| 4,435,117 | 3/1984 | House | 414/620 |
| 4,461,607 | 7/1984 | Smith | 414/406 |
| 4,669,940 | 6/1987 | Englehardt et al. | 294/106 X |

FOREIGN PATENT DOCUMENTS 751794  7/1980  U.S.S.R. ............................. 294/86.4

Primary Examiner—Johnny D. Cherry
Assistant Examiner—Dean J. Kramer
Attorney, Agent, or Firm—Don J. Flickinger; Jordan M. Meschkow

[57] ABSTRACT

A pair of elongate arms, carried by a material handling device such as a refuse collection vehicle, are oppositely movable between a release position and a gripping position. The friction enhancing surface of a belt carried by each arm compliantly engages the perimeter of a container or similar article as the arms move to the gripping position. In response to movement of the arms to the gripping position, a limb pivotally carried by each arm extends to present a segment of the respective belt to engage the surface of a small container.

4 Claims, 5 Drawing Sheets

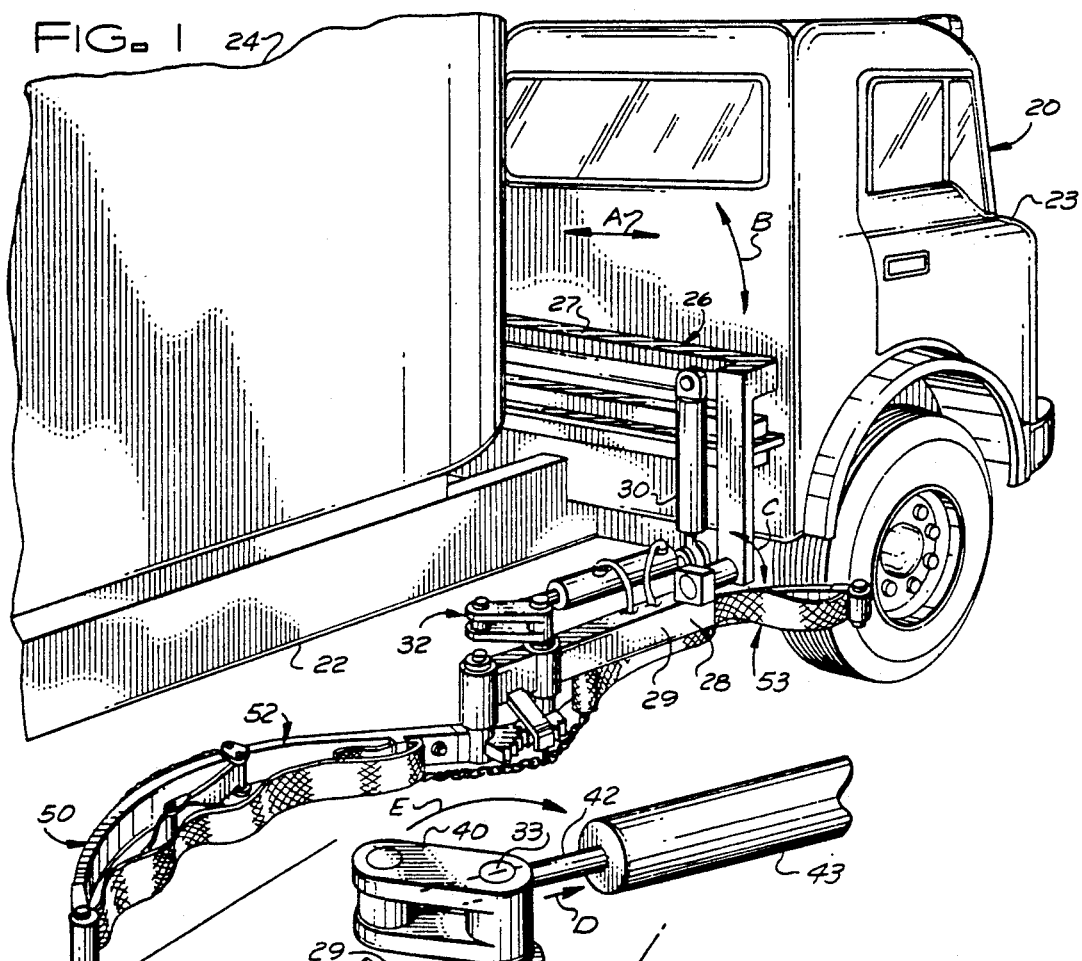
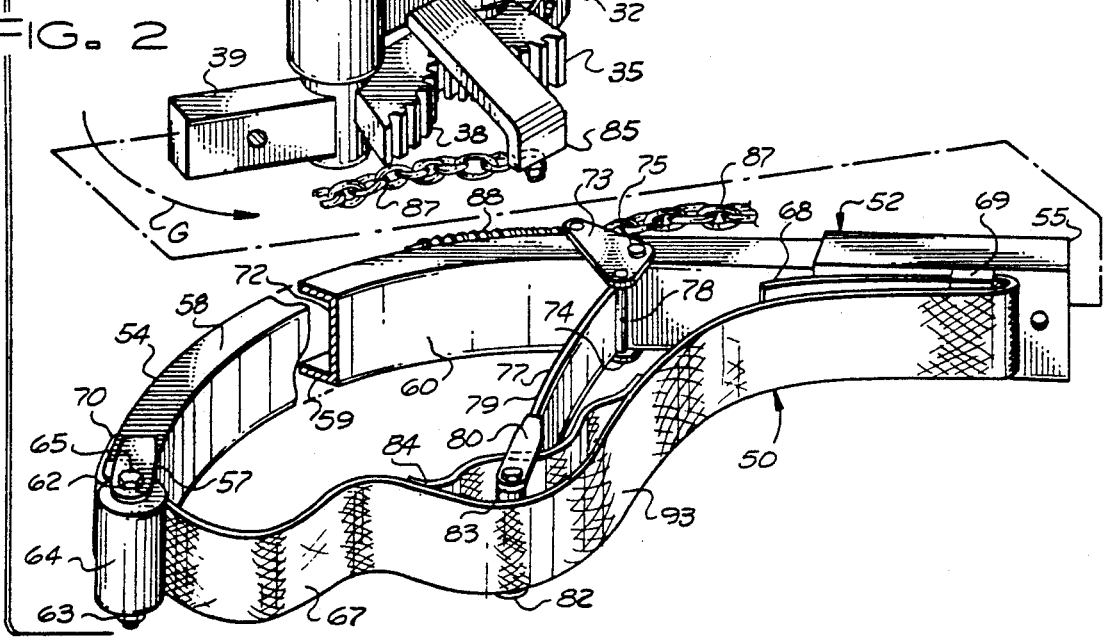

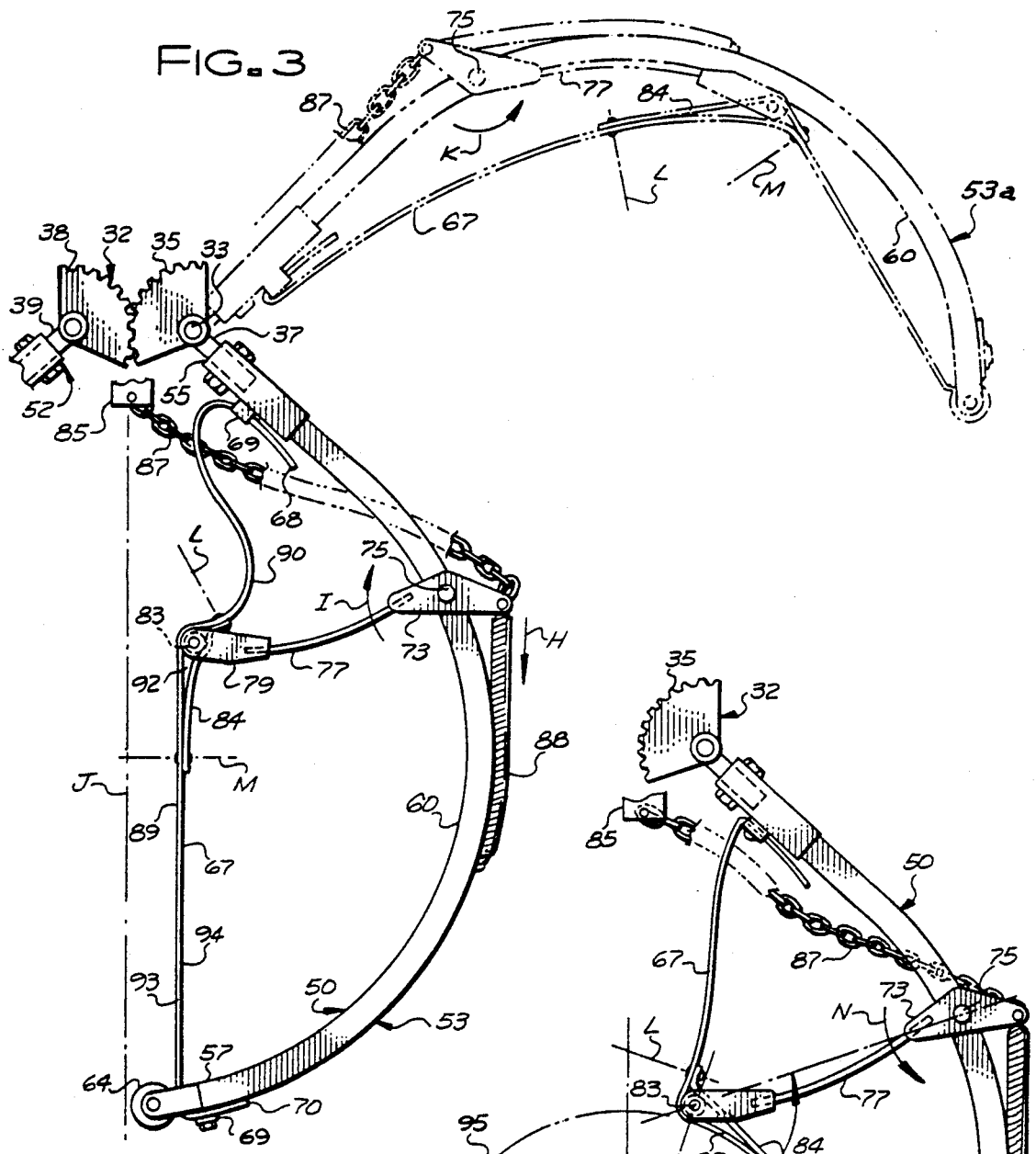

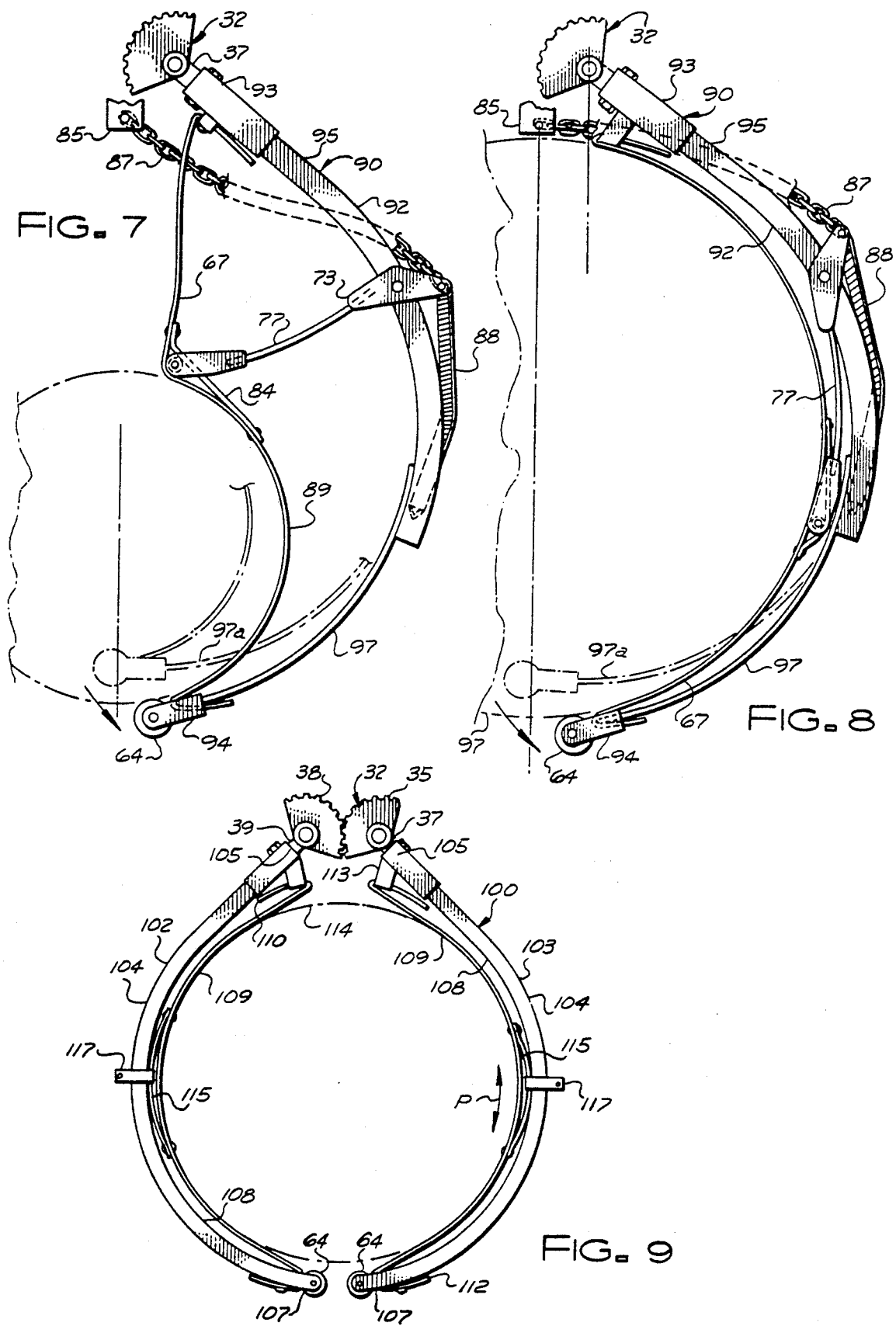

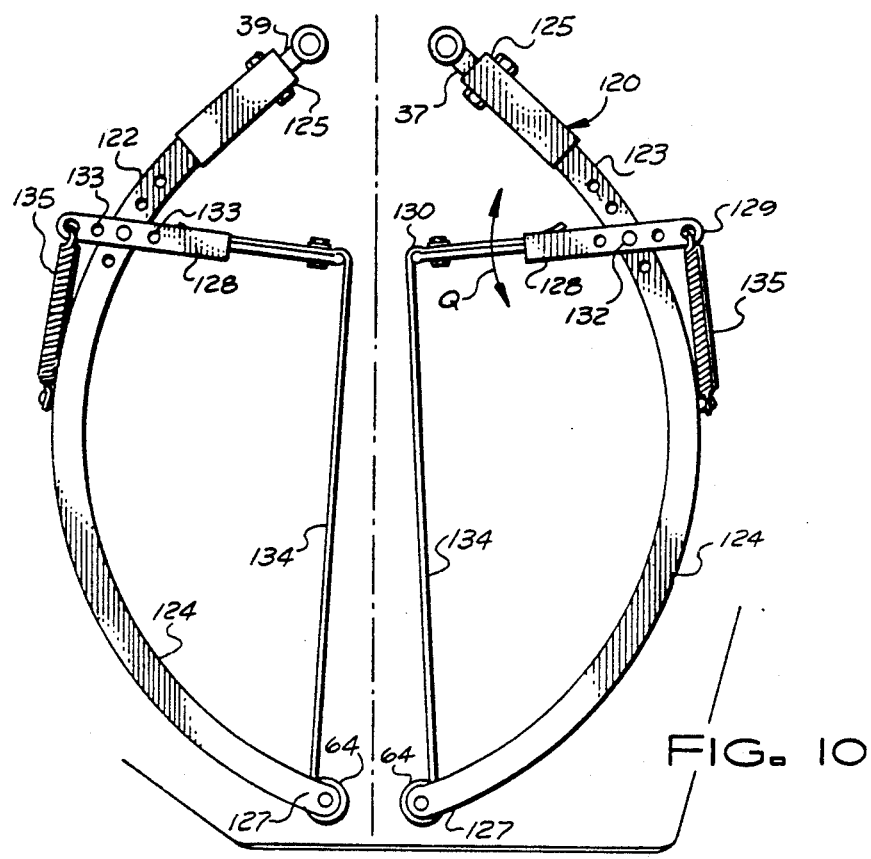
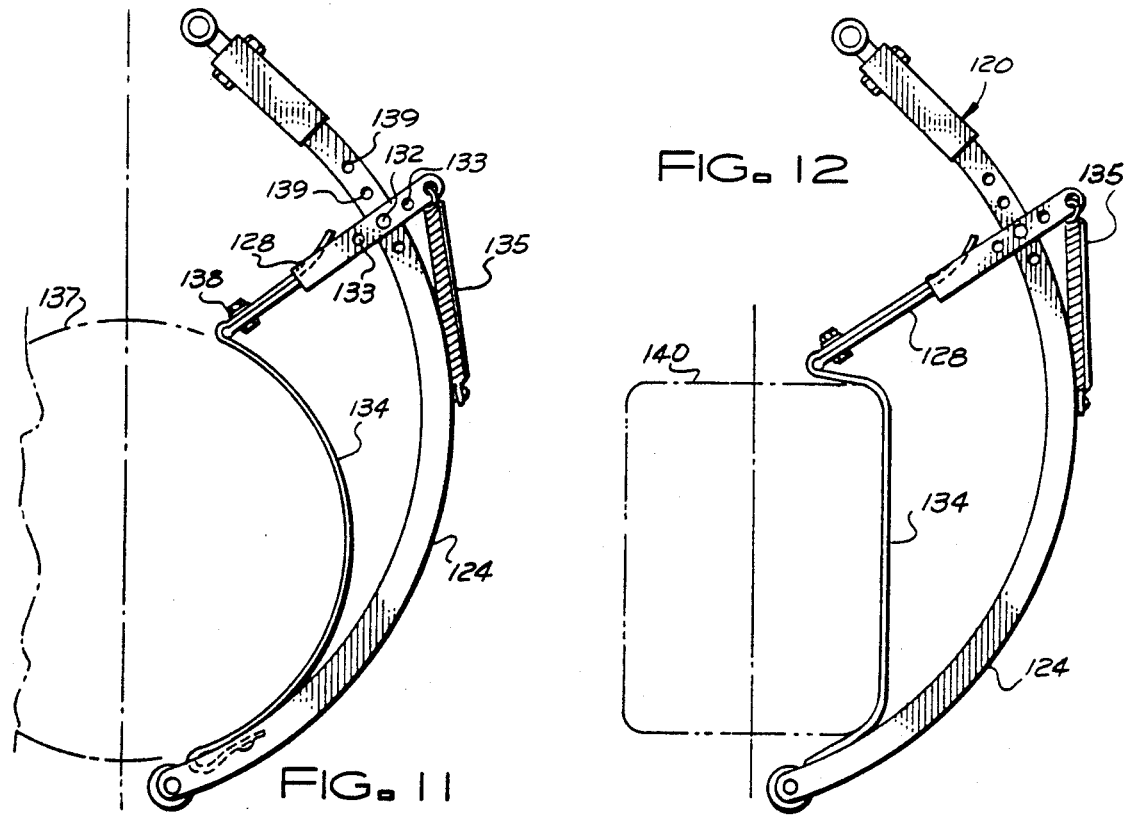

GRIPPING APPARATUS

This application is a continuation, of application Ser. No. 308,839, filed 9 Feb., 1989.

BACKGROUND OF THE INVENTION

1. Field of the Invention

This invention relates to material handling apparatus.

More particularly, the present invention relates to apparatus for gripping and holding containers.

In a further and more specific aspect, the instant invention concerns an apparatus for alternately gripping containers of varied perimeter.

2. The Prior Art

Apparatus for gripping and holding containers or similar articles are well known. Exemplary is the container handling mechanism associated with conventional refuse collection vehicles. The mechanism is utilized to grip, lift and tilt a refuse container for transfer of the contents to the storage bay of the collection vehicle.

A typical container handling apparatus, of particular interest in connection with the instant invention, includes a pair of gripping arms carried at the outboard end of a boom which resides intermediate the storage bay and the cab of a commercially available refuse collection vehicle. Remotely operatable from within the operator's compartment, the mechanism grips and maneuvers a refuse container for transfer of the contents to the receiving hopper of the storage bin.

The boom is reciprocating along a linear path between a retracted position and an extended position. The boom is also angularly movable between a lowered position and an elevated position. An angularly positionable tilt mechanism, pivotably affixed to the outboard end of the boom, supports grip actuating means which are movable between extended and retracted positions. The arms, carried by the grip actuating means, are movable in response thereto between a retracted release position and an extended gripping position.

Normally, as during travel of the vehicle, the boom resides in the lowered retracted position. The arms, being in the extreme release position and extending in substantially opposite directions, reside in close proximity to the side of the vehicle. As the vehicle is brought to a stop adjacent a refuse container, the boom is extended and the arms engaged about the container. The container is then lifted and tilted for deposit of the contents into the hopper. Subsequently, the container is returned to the original location and the handling mechanism regressed to the travel configuration.

Refuse containers are readily available in an array of sizes and shapes. Known, for example, are large stationary containers having a capacity of three hundred to four hundred twenty gallons and a diameter ranging from forty-two to forty-eight inches. Also common are smaller mobile containers with diameters in the range of twenty-two to twenty-eight inches and capacities of sixty to one hundred gallons. The foregoing diameters are taken at the gripping perimeter which resides at approximately twenty-eight inches above the supporting surface. While cylindrical containers are exceedingly common, containers of alternate cross-sectional configuration, such as rectangular, are known.

Various materials, ranging from rigid metal to flexible plastic, are utilized in the fabrication of refuse containers. Particularly favored by the art is polyethylene shaped by various conventional molding processes. The resultant structure includes a comparatively flexible sidewall having a relatively smooth exterior surface. A sidewall taper, usually in the range of four to seven degrees, accommodates mold release and stacking.

The engagement between the arms and the container, which must withstand the lifting, tilting and other maneuvering, is dependent upon the constrictive force of the arms about the container and the friction between respective surfaces. The inherent characteristics of a typical container includes a flexible sidewall with an outer surface having a low coefficient of friction Traditionally, the gripping arms are fabricated of a rigid material, usually metal, also having a relatively low coefficient of friction.

The foregoing characteristics which inhibit satisfactory engagement of the arms with the container are further complicated by other factors. Containers are generally available in two categories, stationary and mobile, having widely variant nominal sizes. Each category is subject to substantial additional variation of diameter and taper. Variation in cross-sectional configuration is also known. Further, the perimeter of a container is frequently distorted as a result of the deposited refuse.

In attempts to alleviate the foregoing problems, the prior art has devised several purported solutions. For example, pads of friction enhancing material have been secured to the normal gripping surface of the arms. Also advanced were flexible arms. However, such solutions have not proven to be entirely satisfactory. Accommodation of variance in cross-sectional size and configuration is extremely narrow, thereby limiting the usefulness of any given pair of arms and the overall efficiency of the respective collection vehicle Even so, when a pair of arms are employed within the given range the frictional contact with the container is less than optimal.

It would be highly advantageous, therefore, to remedy the foregoing and other deficiencies inherent in the prior art.

Accordingly, it is an object of the present invention to provide improvements in gripping apparatus.

Another object of the invention is the provision of an improved apparatus of the type especially adapted for gripping and holding a container.

And another object of this invention is to provide improvements whereby a gripping apparatus can accommodate containers or other articles having diverse cross-sectional measurements.

Still another object of the invention is the provision of means whereby a pair of fixed-size gripping arms can alternately engage containers of varying cross-sectional configuration.

Yet another object of the instant invention is to provide means for enhancing the frictional engagement between a pair of gripping arms and a container or similar article.

Yet still another object of the invention is the provision of means which will detect and self-adjust for the article to be gripped.

A further object of the invention is to provide an improved pair of gripping arms which are capable of substantially continuous contact with a container having a distorted sidewall.

And a further object of the immediate invention is the provision of improvements which are durably constructed and relatively maintenance free.

Still a further object of the invention is to provide improvements which can be readily practiced in combination with conventional, pre-existing material handling devices, such as refuse collection vehicles.

And still a further object of the invention is the provision of improvements, according to the foregoing, which can be retrofit to prior art gripping arms.

SUMMARY OF THE INVENTION

Briefly, to achieve to desired objects of the instant invention in accordance with a preferred embodiment thereof, first provided is a pair of arms securable to the actuating means of a prior art material handling apparatus such as a conventional refuse collection vehicle. The arms are movable in opposing directions in response to the actuating means between a release position when the actuating means are in a retracted position and a gripping position when the actuating means is in the extended position An elongate flexible member is carried by each of the arms. As the arms move from the retracted or release position to the extended or gripping position, the elongate members engage the perimeter of an article, such as a refuse container.

Preferably, each arm is elongate and includes a fixed end secured to the actuating means, a free end and an inner surface. Each of the elongate members is secured to the respective arm at an inner location proximate the fixed end of the arm at an outer location proximate the free end of the arm. Having a length intermediate the locations which is lesser than the corresponding length of the arm, the flexible member is held in spaced relationship to the inner surface. Stabilizing means carried by each arm supports the respective flexible member at a location intermediate the inner location and the outer location. Also included are adjustment means for selectively varying the length of the flexible member intermediate the inner location and the outer location.

Bearing means carried proximate the free end of each arm contact the perimeter of the container and guides the arm about the container as the arms move from the release position to the gripping position. Further, each arm may include a substantially rigid initial portion extending from the actuating means and a substantially flexible terminal portion extending from the rigid portion. In the preferred embodiment, the elongate flexible member is generally in the form of a strap having a friction enhancing gripping surface for engaging the perimeter of the container.

In accordance with an alternately preferred embodiment of the invention, which includes the previously noted arms, there is provided a limb pivotally secured to each arm an extending inwardly therefrom. Each elongate member extends between the respective arm and the respective limb. Biasing means normally rotate each limb in a direction for placing the respective flexible member in tension. The flexible members compliantly engage the perimeter of the container in response to movement of the arms to the extended position.

More specifically, each flexible member is secured to the respective arm proximate the free end thereof. The biasing means normally urges rotation of the limb in a direction away from the free end of the arm. Each flexible member has an effective length intermediate the respective arm and the respective limb which limits rotation of the respective limb in response to the biasing means. Additionally, each limb may be pivotally secured to the respective arm at selective locations along the respective arm. Further, the limb may be pivotally secured to the arm at selective locations along the limb.

In accordance with yet another embodiment of the invention, there are provided means for alternately gripping a first container and a second container wherein the perimeter of the first container is larger than the perimeter of the second container. According to the immediately preferred embodiment, a flexible member is secured to each respective arm at an inner location and an outer location. Grip control means carried by each arm normally present the respective flexible member for engaging the perimeter of the second container and alternately present the flexible member for engaging the perimeter of the first container in response to the presence of the first container as the arms move from the retracted position to the extended position.

More specifically, each grip control means includes a limb pivotally extending from the respective arm and movable between a retracted position and an extended position. First means move the limb to the retracted position in response to movement of the arm to the retracted position. Second means move the limb to the extended position in response to the movement of the respective arm to the extended position. In response to the presence of the first container, as the arms move from the retracted position to the extended position, the limb is moved toward the retracted position. Preferably, the second means includes biasing means, such as a tension spring, extending between the limb and the respective arm. Similarly, the first means includes tension means such as a chain or cable extending between the limb and the grip actuating means, for overcoming the biasing means as the arm is moved to the retracted position.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a partial perspective view of a material handling device, specifically illustrated as a refuse handling vehicle, including gripping apparatus embodying the principles of the instant invention;

FIG. 2 is an enlarged fragmentary perspective view of the improved gripping apparatus of FIG. 1;

FIG. 3 is a fragmentary top plan view of the apparatus seen in FIG. 2, the apparatus being shown in the gripping position with the release being shown in broken outline;

FIG. 4 is a view generally corresponding to the illustration of FIG. 3 and showing the apparatus thereof as it would appear when gripping a smaller container;

FIG. 7 is a view generally corresponding to the view of FIG. 4 and illustrating an alternate embodiment of the instant invention;

FIG. 8 is a view generally corresponding to the view of FIG. 7 and illustrating the embodiment thereof as it would appear when alternately engaging a larger container;

FIG. 9 is a top plan view of yet another embodiment of a gripping apparatus constructed in accordance with the teachings of the instant invention;

FIG. 10 is a top plan view of a pair of conventional prior art gripping arms having been retrofitted with a kit as set forth by the instant invention;

FIG. 11 is a view generally corresponding to the illustration of FIG. 10 and showing the apparatus thereof as it would appear when engaging and gripping a smaller container having a circular cross section; and FIG. 12 is a view corresponding to the illustration of FIG. 11 and showing the device thereof as it would appear after having gripped a smaller container of rectangular cross section.

DETAILED DESCRIPTION OF THE PREFERRED EMBODIMENTS

Figure 5:
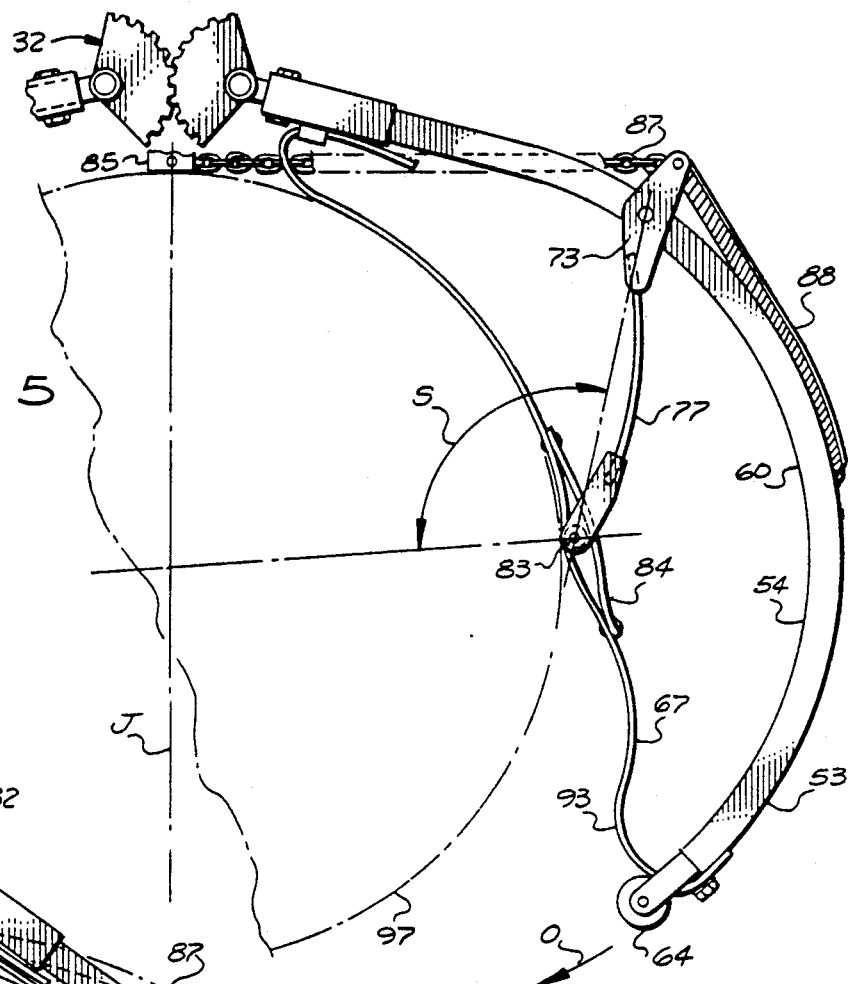
FIG. 5 is a view generally corresponding to the view of FIG. 3 and illustrating the apparatus thereof as it would appear during an intermediate stage of movement between the release position and the gripping position as it would appear when engaging a larger container.

Turning now to the drawings, in which like reference characters indicate corresponding elements throughout the several views, attention is first directed to FIG. 1 which illustrates a refuse collection vehicle, generally designated by the reference character 20, including frame 22 supporting forwardly located cab 23 and rearwardly located storage bay 24. Although not specifically illustrated, but as will be readily recognized by those skilled in the art, an operator's compartment is located within cab 23. Similarly, a hopper for receiving refuse is located in the forward portion of storage bay 24.

A container handling mechanism, generally designated by the reference character 26, is carried by frame 22 intermediate cab 23 and storage bay 24. Container handling mechanism 26 includes boom 27 which is reciprocally removable along a linear path, transverse to vehicle 20 as indicated by the double arrowed line A, between a retracted position as shown and an extended position. Boom 27 is also angularly movable, as represented by the double arrowed line B, between a lowered position as shown and an elevated position. A tilt mechanism 28 including beam 29 is pivotally affixed to the outboard end of boom 27 for rotation, as indicated by the double arrowed line C in response to hydraulic cylinder 30, about an axis which is parallel to the longitudinal axis of vehicle 20.

A grip actuating assembly, generally designated by the reference character 32 as seen in greater detail with reference to FIG. 2, is carried by beam 29. Grip actuating assembly 32 includes first and second shafts 33 and 34 which are parallel and rotatably journalled within beam 29. Segment gear 35 and mounting bracket 37 are carried by shaft 33 for rotation therewith. Similarly, segment gear 38 and mounting bracket 39 are carried by shaft 34. Lever 40 is drivingly engaged, at one end thereof, to shaft 33. Operating rod 42 of hydraulic cylinder assembly 43 is pivotally connected to the other end of lever 40.

Grip actuating assembly 32 is movable between a retracted position and an extended position The retracted position is illustrated. In response to movement of actuating rod 42 in the direction of arrowed line D, lever 40 is caused to move in the direction of arrowed line E urging counterrotation of shafts 33 and 34. Accordingly, mounting brackets 37 and 39 move in the directions indicated by the arrowed lines F and G, respectively, to an extended position.

Normally, a pair of gripping arms are carried by the grip actuating assembly More specifically, one end of each arm is affixed to a respective mounting bracket. The arms are movable between a release position and a gripping position in response to movement of the actuating assembly between the retracted position and the extended position, respectively. In the extreme release position, the arms are substantially diametrically opposed and lie in substantial juxtaposition with the side of the refuse collection vehicle.

During travel of vehicle 20, boom 27 is normally carried in the lowered retracted position The gripping arms reside at the extreme release position. Tilt mechanism 28 is positioned as such that the gripping arms are substantially horizontal with the ground. As the vehicle is brought to a stop adjacent a refuse container, boom 27 is extended and grip actuating means 32 set in motion to bring the arms into the grip position and engage the perimeter of the container. The boom is then retracted and lifted as necessary to position the container adjacent the hopper of the storage bay. The tilt mechanism is then engaged to rotate the container for transfer of the contents to the hopper. Finally, the procedure is reversed to return the empty container to the initial location and return the container handling mechanism 26 to the travel position.

Set forth for purposes of orientation and reference in connection with the ensuing detailed description of preferred embodiments of the instant invention, the foregoing brief description of refuse collection vehicle 20 is intended to be generally representative of typical commercially available vehicles of the type. The description is also applicable to other material handling apparatus of the type normally utilizing a pair of gripping arms to engage a container or similar device. Details not specifically illustrated and described will be readily understood and appreciated by those skilled in the art.

Referring again to FIGS. 1 and 2, there is seen a gripping apparatus generally designated by the reference character 50 and constructed in accordance with the teachings of the instant invention. Gripping apparatus 50 includes first and second gripping members 52, 53, respectively, which are illustrated in the extreme release or travel position in FIG. 1. Each gripping member 52 and 53 is a mirror image of the other. Accordingly, in the following detailed description it is to be understood that elements and function described in connection with one of the gripping members is correspondingly applicable to the other.

Referring now to FIG. 2, it is seen that gripping member 52 includes an arm 54 which, in general similarity to the prior art, is elongate and extends between fixed end 55 and free end 57. Generally characterized as being arcuately inturned, arm 52 is preferably fabricated of a rigid material such as channel steel being generally C-shaped in cross section. In further similarity to the prior art, fixed end 55 is rigidly secured to mounting bracket 39. In accordance with the immediately preferred embodiment of the invention, it is preferred that mounting bracket 39 be shaped and sized to be closely received within the channel of arm 52 and affixed thereto by one or more bolts in accordance with conventional procedure. Arm 52 further includes a top surface 58, a bottom surface 59 and an inner surface 60, the latter opposing a container in spaced relationship as will be described in further detail presently.

Upper and lower fingers 62 and 63, projecting from the free end 57 of arm 52, are spaced apart to carry roller 64 therebetween. Bolt 65 extending through the fingers 62 and 63 and roller 64, supports roller 64 for rotation about a substantially upright axis.

An elongate flexible member 67 is carried by arm 52 in generally spaced relationship to inner surface 60. Near the inner end 68, flexible member 67 is secured to the inner surface 60 of arm 52 by clamp member 69 which may be secured by bolts or other common fastening means to arm 52. Near the outer end 70, flexible member 67 passes between the fingers 62 and 63 intermediate the end 57 of arm 52 in roller 64 and is secured to the outer surface 72 of arm 52. Although not specifically shown, it is to be understood that end 70 is secured to surface 72 in a manner analogous to the securement of end 68 to surface 60.

An upper bell crank 73 and a corresponding lower bell crank 74 are pivotally secured at an intermediate location thereof to top surface 58 and bottom surface 59, respectively, of arm 52 by bolt 75 for mutual rotation about a substantially upright axis Limb 77, preferably an elongate rigid member, extends between an inner end 78 which is rigidly affixed between the inboard edges of bell cranks 73 and 74 and an outer end 79 from which project upper and lower fingers 80 and 82, respectively. Cylindrical member 83 resides intermediate fingers 80 and 82 at a location spaced from the outer end 79 of limb 77. While cylindrical member 83 may be rigidly affixed, it is preferred that the member be journalled for rotation about a substantially upright axis.

Secondary flexible member 84, passing through the opening defined between fingers 80 and 82 and between end 79 and cylindrical member 83, is attached at the ends thereof to flexible member 67.

Bracket 85, extending from beam 29, terminates at a location outboard of segment gears 35 and 38. Chain 87 is fixed at respective ends to bracket 85 and to the outboard ends of bell cranks 73 and 74. Tension spring 88 is secured at respective ends to the outboard ends of bell cranks 73 and 74 and to arm 52 at a location outboard of the axis of rotation of bell cranks 73 and 74.

With reference to the solid line illustration in FIG. 3, it is seen that bolt 75 which functions as the pivot for bell cranks 73 and 74 resides at an intermediate location along gripping member 53 which is closer to fixed end 55 than to free end 57. Tension spring 88, exerting a force in the direction indicated by the arrowed line H, normally urges rotation of bell cranks 73 and 74 and the associated limb 77 in a direction indicated by the arrowed line I. Rotation in the direction of arrowed line I is limited by the length of a segment of flexible member 67 as will be described in detail presently. For reasons which will become apparent as the description proceeds, bolt 75, which functions as the pivot for bell cranks 73 and 74, resides at an intermediate location of gripping member 53 which is closer to fixed end 55 than to free end 57. Limb 77 is preferably arcuate, having a curve which substantially corresponds to the curve of inner surface 60. Cylindrical member 83 resides on the adjacent side of the center line of the fully extended gripping members 52 and 53 as represented by the broken line J.

In response to movement of the grip actuating assembly 32, more specifically the segment gears 35 and 38, the gripping members 52 and 53 move to the retracted position shown in broken outline and represented by the reference character 53A. Bracket 85, the point of attachment of the inboard end of chain 87, is spaced inboard of first shaft 33, the axis of rotation of gripping member 53. Accordingly, as gripping member 53 moves from the extended position to the retracted position the distance between the mounting location of the inboard end of chain 87 and bolt 75, the center of rotation of bell cranks 73 and 74, gradually increases. The distance from bracket 85 to bolt 75, measured along a straight line, is at a minimum when arm 53 is in the fully extended position and at a maximum when gripping apparatus 53 is in the fully retracted position The length of chain 87, from the attachment at bracket 85 and the attachment at bell cranks 73 and 74, is such that when gripping member 53 is in the fully retracted position bell cranks 73 and 74 are rotated in the direction indicated by the arrowed line K with limb 77 abutting the inner surface 60 of arm 54. Accordingly, when arm 54 is in the fully extended position, chain 87 is slack and bell cranks 73 and 74 are subject to the influence of tension spring 88 whereby limb 77 is in the fully extended position. As a result of the curvature, limb 77 lies in close proximity along the length thereof to inner surface 60 of arm 54. Is apparent from the foregoing that chain 87 is typically representative of a cable or other non-extendable flexible coupling which functions as a tension member.

Secondary flexible member 84 is secured to elongate flexible member 67 at an inner location represented by the broken line L and at an outer location represented by the broken line M. For purposes of reference, elongate flexible member 67 can be considered to include a first segment 89 extending from attachment point L to arm 54 proximate the outboard end and a second segment 90 extending from the attachment point M to arm 54 proximate the inboard end. The length of elongate flexible member 67 intermediate attachment points L and M is common to the segments 89 and 90.

Elongate flexible member 67 and secondary flexible member 84 form a channel 92 intermediate attachment points L and M along which cylindrical member 83 is movable. The working or effective length of elongate flexible member 67, i.e. the segment intermediate points of engagement with arm 54, is sufficient to accommodate retraction of limb 77 as seen in the broken outline. In this position, cylindrical member 83 resides proximate the contact point M. With limb 77 in the extended position, as seen in solid outline, cylindrical member 83 resides proximate the inner contact point L with segment 89 being substantially extended and segment 90 being relatively slack. Accordingly, the movement of limb M in the direction indicated by the arcuate arrowed line I is limited by the length of first segment 89. The effective length of flexible member 67 and of each of the segments 89 and 90 is selectively adjustable as a result of the clamp 69 which secures respective ends to the arm 54.

Referring momentarily again to FIG. 2, it is seen that elongate flexible member 67 is preferably in the form of a relatively wide belt or strap having a friction enhancing engagement surface 93 which normally opposes the corresponding surface of the elongate flexible member supported by first grip actuating member 52 and a back surface 94 which opposes inner surface 60 of arm 54. Exemplary is the belt distributed by Victor Bloto under the designation ROUGH TOP®. Particularly preferred is the polyester model having a width of approximately 4 inches and a thickness of approximately ⅜ inches.

Conventional commercially available refuse containers are generally available in two series. The larger series, generally designated as stationary containers, typically have a capacity of three hundred to four hundred twenty gallons with a gripping perimeter ranging from forty-two to forty-eight inches in diameter The smaller series, generally designated as mobile containers, typically have a capacity in the range of sixty to one hundred gallons and a gripping perimeter ranging from approximately twenty-two inches to twenty-eight inches. For purposes of uniformity, the gripping perimeter is established at an above-ground height of twenty-eight inches.

The previously described embodiment of the instant invention is capable of alternately gripping the larger containers and the smaller containers. For this purpose, the effective length of elongate flexible member 67 is less than one half of the perimeter measurement of the smallest container in the larger series Similarly, the effective length of segment 89 is less than one half of the perimeter measurement of the smallest container in the smaller series. The gripping of larger containers and small containers will now be described in detail.

Schematically represented in broken outline designated 95 in FIG. 4 is the gripping perimeter of a smaller container. As gripping member 53 moves from the retracted position to the extended position, chain 87 is relaxed subjecting bell cranks 73 and 74 to the influence of tension spring 88. Accordingly, limb 77 is urged toward the extended position positioning cylindrical member 83 from roller 64 a distance which is greater than the cross sectional measurement of the smaller container. Also, grip enhancing surface 93 of segment 89 is presented for engagement with the gripping perimeter of the smaller container. As surface 93 contacts perimeter 95, segment 89 is urged in a direction toward inner surface 60 of arm 54 compliantly assuming the shape of perimeter 95. Concurrently, cylindrical member 83, against the biassing of tension spring 88, is drawn towards perimeter 95 with movement of limb 77 in the direction indicated by the arcuate arrowed line N. Movement of gripping member 53 continues in a direction toward the extended position, as represented by the arcuate arrowed line 0, until the full length of segment 89 is engaged with the perimeter 95. Roller 64, if necessary, contacts perimeter 95 to guide arm 54 about the container. The corresponding segment 89 of gripping member 52 is similarly engaged in opposition. Being flexible, the segments 89 readily accommodate any variations or irregularities in perimeter 92 to provide an efficient grip which will withstand the lifting, tilting and other maneuvering of the container.

The arcuate arrowed line R denotes the angle between the longitudinal axis of limb 77 and the radius of the container intersecting the point of tangency with perimeter 95 and roller 83. As a result of experimentation, it is believed that the angle R must be less than 180° for efficient operation.

The component, including bell cranks 73 and 74, limb 77, and cylindrical member 83 and subject to the influences of chain 87 and spring 88, functions as grip control means for presenting segment 89 for engagement with the perimeter of the smaller series container. The assembly also functions as grip control means for detecting the presence of a larger series container and presenting the full effective length of flexible member 67 for engagement with the perimeter thereof. The perimeter of a larger series container is schematically represented by the broken outline designated 97 in FIG. 5.

Figure 6:
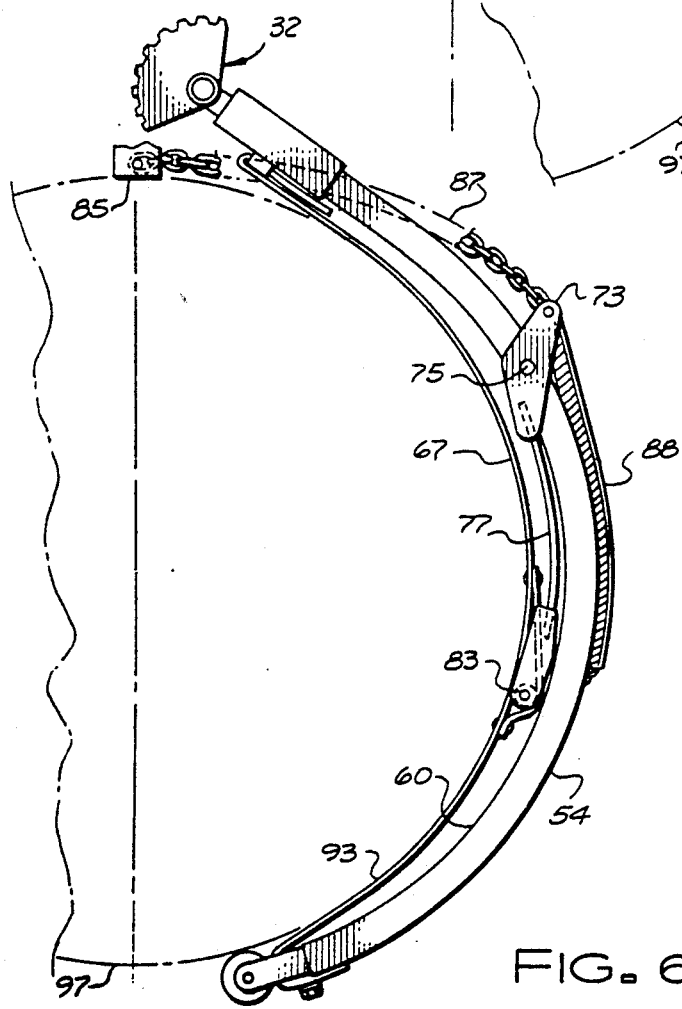
FIG. 6 is a view generally corresponding to the view of FIG. 5 and illustrating the apparatus as it would appear after having fully engaged the larger container.

At an intermediate position in the movement of the gripping member 53 from the retracted position to the extended position, as limb 77 concurrently moves from the retracted position to the extended position, cylindrical member 83 contacts the perimeter 97. It will be appreciated that the contact between cylindrical member 83 and perimeter 97 is indirect as a result of the presence of flexible member 67 therebetween. Similarly, it will be appreciated that the angle of contact designated by the double arrowed arcuate line S is greater than 90 degrees. As a result, the movement of limb 77 is terminated as the movement of arm 54 continues. During the movement of gripping member 53, bracket 85 functions as an abutment for perimeter 97 while roller 64 functions as a guide for the free end of arm 54, if necessary. As previously noted, the effective length of flexible member 67 is shorter than the corresponding length of inner surface 60 of arm 54. As a result, in the fully extended position as seen in FIG. 6, flexible member 67 is engaged with perimeter 97 while surface 60 of arm 54 resides in spaced relationship. Accordingly the container is gripped by the shape conforming members 67.

Turning now to FIG. 7 there is seen an alternate gripping member, generally designated by the reference character 90 and constructed in accordance with the teachings of the instant invention, including arm 92 generally arcuately extending between fixed end 93 and free end 94. Arm 92 includes an initial portion 95 carrying fixed end 93 and a terminal portion 97 extending from the initial portion 95 and carrying free end 94. Initial portion 95, which may be fabricated of steel channel, is substantially rigid. Terminal portion 97, which may be fabricated of spring steel, is substantially flexible In all other respects not specifically illustrated, gripping member 90 is analogous to the previously described gripping member 53.

Terminal portion 97 is inwardly biassed to normally reside at a position as graphically represented by the broken outline designated 97A. Contact of the roller 64 with perimeter 95 urges portion 97 outwardly to a position as shown in solid outline. The flexibility of section 97 cooperates with the flexibility of member 67 to further accommodate diverse configurations of the perimeter 95. The engagement of gripping member 90 with the perimeter 97 of a large container is seen with respect to FIG. 8.

Another embodiment of the invention, especially devised for holding a single size container but readily conforming to variations of the perimeter, will now be described with reference to FIG. 9. The alternate gripping apparatus, generally designated by the reference character 100, includes first and second gripping members 102 and 103, respectively, which are opposing mirror images. Each gripping member 102 and 103 includes an arcuate arm 104 extending between a fixed end 105, which is secured to a respective mounting bracket 37 and 39 and a free end 107 carrying a previously described roller 64. Each arm 104 further includes an inner surface 108.

An elongate flexible member 109, of the character previously described in connection with the elongate member 67, having inner end 110 and outer end 112 is carried by each arm 104. An attachment bracket 113 extends substantially radially inward from the fixed end 105 of each arm 104. Flexible member 109 is secured proximate each end as previously described. Also as previously described, the effective length of flexible member 109 is shorter than the corresponding length of the inner surface 108.

The perimeter of an exemplary container is represented by the broken line 104. The mounting brackets 113 serve to place the inner end of each flexible member 109 in close proximity to the perimeter 114, thereby insuring that a greater length of flexible member 109 is brought into contact with perimeter 114. Secondary flexible member 115 is secured to elongate flexible member 109 at an intermediate location as previously described. Support bracket 117, carried by arm 104 encircles secondary flexible member 115 for movement in reciprocal directions as indicated by the double arrowed line P. The relative movement between support bracket 117 and secondary flexible member 115 is analogous to the movement between secondary flexible member 84 and the free end of limb 77 as previously described. In addition to allowing movement of flexible member 109 to accommodate the peculiarities of perimeter of 114, support bracket 117 stabilizes flexible member 109 for movement with arm 104, especially as the container is tilted.

Still another embodiment of the instant invention, generally designated by the reference character 120 is illustrated in FIG. 10. In general analogy to the previously described embodiments, the immediate embodiment includes first and second gripping members 122 and 123 respectively, which are mirror images and are opposed for movement between a retracted position and an extended position in response to grip actuating assembly 32. Each gripping member 122 and 123 includes an inwardly curved arm 124 extending between a fixed end 125, secured to a respective one of the mounting brackets 37 and 39, and a free end 127 carrying roller 64. A limb 128 having outboard end 129 and inboard end 130 is pivotally secured to arm 124 for rotational movement as indicated by the double arrowed arcuate line Q. Bolt 132 extends through one of a plurality of spaced apart openings 133 extending along limb 128. The openings 133 provide for selective placement of limb 128 relative arm 124 for purposes as will become apparent as the description proceeds. An elongate flexible member 134 extends between the inboard end 130 of limb 128 and the free end 127 of arm 124. Tension spring 135 is secured, respective ends, to the outboard end 129 of limb 128 and to arm 124 at a location in a direction toward free end 127. Tension spring 135 normally urges rotation of limb 128 in a direction of rotation which is limited by the length of flexible member 134.

An exemplary container having a generally circular perimeter represented by the broken outline designated 137 is viewed in FIG. 11. Gripping members 122 and 123 move between a retracted position and an extended position as previously described. As the flexible members 134 are brought into contact with the perimeter 137 and the arms 124 continue to move toward the extended position, the springs 135 extend whereby the members 134 which are normally held in tension, are flexibly deformed to assume the shape of and engage the perimeter 137. By virtue of being detachably secured to limb 128 by bolts 138, the effective length of flexible member 134 is selectively variable. The effective length of limb 128, the distance between free end 130 and pivot bolt 132, is also variable by selection of a specific hole 133. Accordingly, gripping apparatus 120 is incrementally adjustable for various sized containers. The adjustment is further enhanced by the openings 139 spaced along arm 124, each of which will receive the bolt 132 and provide a mounting location for limb 128. The use of the immediate embodiment to grip a container having a generally rectangular perimeter represented by the broken outline 140, is viewed with respect to FIG. 12.

Various changes and modifications to the embodiments herein chosen for purposes of illustration will readily occur to those skilled in the art. For example, the elements described in connection with a specific embodiment are readily usable in combination with any of the other embodiments. It is also noted that the container accommodating elements may be fabricated as a kit for retrofit to pre-existing arms. To the extent that such modifications and variations do not depart from the spirit of the invention, they are intended to be included within the scope thereof which is accessed only by a fair interpretation of the following claims.

Having fully described and disclosed the instant invention, and alternately prepared embodiments thereof, in such clear and concise terms as to enable those skilled in the art to understand and practice the same, the invention claimed is:

1. A gripping apparatus for use in combination with a container handling mechanism having grip actuation means selectively movable between a retracted position and an extended position and for alternately gripping a first container having a perimeter, and a second container having a perimeter smaller than the perimeter of the first container said gripping apparatus comprising:

a) a first arm mounted for rotation about a first pivot point on said actuating means, said first arm including a fixed end rigidly secured to said actuating means and a free end spaced from said fixed end;

b) a second arm mounted for rotation about a second pivot point on said actuating means, said second arm including a fixed end rigidly secured to said actuating means and a free end spaced from said fixed end;

said first and second arms being movable in opposing directions in response to said actuating means between a retracted position for alternately receiving said first container and said second container, and an extended position for at least partially encircling the respective said container in spaced relationship to the perimeter thereof;

c) a first elongate flexible member having a first end secured to the fixed end of said first arm and a second end secured to the free end of said first arm;

p1 d) a second elongate flexible member having a first end secured to the fixed end of said first arm and a second end secured to the free end of said first arm; and e) grip control means carried by each said arm for normally presenting the respective said flexible member for tautly engaging the perimeter of said second container and for alternately presenting said flexible member for tautly engaging the perimeter of said first container in automatic response to the presence of said first container as said arms move from the retracted position to the extended position wherein each said grip control means comprises i) divider means for dividing said respective flexible member into a first segment and a second segment, wherein the effective length of said first segment is less than half the perimeter of said second container and the effective length of said first and second segments combined is less than half the perimeter of said first container; and ii) means responsive to the movement of said arm into an extended position for normally presenting the full effective length of said first segment for engagement with the perimeter of said second container and for automatically moving the effective combined lengths of said first and second segments into engagement with the perimeter of said first container when said first container is present between said arms.

2. In a container handling apparatus for gripping and moving a container:

said apparatus including grip actuating means selectively movable between a retracted position and an extended position, and said container including a perimeter, improvements therein for accommodating variations in the shape of the perimeter of said container, said improvements comprising:

a) a first arm securable to said grip actuating means and having a fixed end and a free end;

b) a second arm securable to said grip actuating means and having a fixed end and a free end;

said first and said second arms being movable in opposing directions in response to movement of said grip actuating means between said retracted and extended positions;

c) a first limb having a first end pivotally secured to said first arm at a location intermediate said fixed end and said free end, and a second end extending inwardly therefrom;

d) a second limb having a first end pivotally secured to said second arm at a location intermediate said fixed end and said free end, and a second end extending inwardly therefrom;

e) a first elongate flexible member having one end secured to the second end of said first limb and an opposite end secured to the free end of said first arm;

f) a second elongate flexible member having one end secured to the second end of said second limb and an opposite end secured to the free end of said second arm;

g) first biasing means normally rotating said first limb in a direction for placing said first flexible member in tension;

h) second biasing means normally rotating said second limb in a direction for placing said second flexible member in tension, said first and second members being compliantly engageable with the perimeter of said container in response to movement of said first and second arms to said extended position.

3. A gripping apparatus for use in combination with a container handling mechanism having grip actuation means selectively movable between a retracted position and an extended position and for alternately gripping a first container having a perimeter, and a second container having a perimeter smaller than the perimeter of the first container, said gripping apparatus comprising:

a) a first arm mounted for rotation about a first pivot point on said actuating means, said first arm including a fixed end rigidly secured to said actuating means and a free end spaced from said fixed end;

b) a second arm mounted for rotation about a second pivot point on said actuating means, said second arm including a fixed end rigidly secured to said actuating means and a free end spaced from said fixed end;

said first and second arms being movable in opposing directions in response to said actuating means between a retracted position for alternately receiving said first container and said second container, and an extended position for at least partially encircling the respective said container in spaced relationship to the perimeter thereof;

c) a first elongate flexible member having a first end secured to the fixed end of said first arm and a second end secured to the free end of said first arm;

d) a second elongate flexible member having a first end secured to the fixed end of said first end secured to the fixed end of said first arm and a second end secured to the free end of said first arm; and e) grip control means carried by each said art for normally presenting the respective said flexible member for tautly engaging the perimeter of said second container and for alternately presenting said flexible member for tautly engaging the perimeter of said first container in automatic response to the presence of said first container as said arms move from the retracted position to the extended position, wherein each of said grip control means comprises means for normally presenting a first portion of the respective flexible member for tautly engaging the perimeter of said second container along a continuous length thereof and for alternately presenting a larger portion of said flexible member for tautly engaging the perimeter of said first container along a continuous length thereof in response to the presence of a larger container as the arms move from said retracted position to said extended position.

4. A gripping apparatus according to claim 3, wherein the length of said first portion is equal to at least one fourth the perimeter of said second container, and the length of said second portion is equal to at least one fourth the perimeter of said first container.

* * * * *